United States Patent [19]

Barone

[11] Patent Number: 5,723,777

[45] Date of Patent: Mar. 3, 1998

[54] MARINE IMPELLER TESTER

[76] Inventor: Larry A. Barone, 10844 W. Michael Dr., Sun City, Ariz. 85373

[21] Appl. No.: 622,260

[22] Filed: Mar. 26, 1996

Related U.S. Application Data

[60] Division of Ser. No. 341,675, Nov. 17, 1994, Pat. No. 5,503,022, which is a continuation-in-part of Ser. No. 253,972, Jun. 3, 1994, Pat. No. 5,445,012, which is a continuation of Ser. No. 8,474, Jan. 25, 1993, abandoned.

[51] Int. Cl.$^6$ .................................................. G08B 21/00
[52] U.S. Cl. .................................................. 73/116
[58] Field of Search ........................ 73/4 R, 4 V, 115, 73/116, 117.1, 714, 740; 116/26, 264–266, 271, 291, 300; 440/2, 1, 88

[56] References Cited

U.S. PATENT DOCUMENTS

| | | | |
|---|---|---|---|
| 4,728,306 | 3/1988 | Schneider | 440/1 |
| 4,842,559 | 6/1989 | Litjens et al. | |
| 5,045,001 | 9/1991 | Borst | 440/1 |
| 5,051,104 | 9/1991 | Guhlin | 440/88 |

Primary Examiner—Robert Raevis
Attorney, Agent, or Firm—H. Gordon Shields

[57] ABSTRACT

A marine engine is provided with a drive unit which incorporates a water impeller to supply water to the marine engine in order to maintain proper engine cooling. Devices are currently available that allow the watercraft's engine to be started when the craft is not in actual service. These devices attach to the crafts out drive unit and they provide for water, from a household faucet, to be supplied to the water impeller. These devices have no form of measurement to communicate to the operator that a sufficient amount of water is initially being supplied to the water impeller to prevent damage to that component nor do they communicate if the water impeller is capable of producing sufficient suction to feed the crafts engine with sufficient coolant so that the engine will not over-heat when the craft is placed in its operating environment. The present invention includes an impeller tester which may be placed in existing drive water supply devices or which may be permanently installed in the water craft. The apparatus communicates to the operator of the craft that a sufficient supply of water is available and that the water impeller will not be damaged upon starting and running the craft's engine.

7 Claims, 5 Drawing Sheets

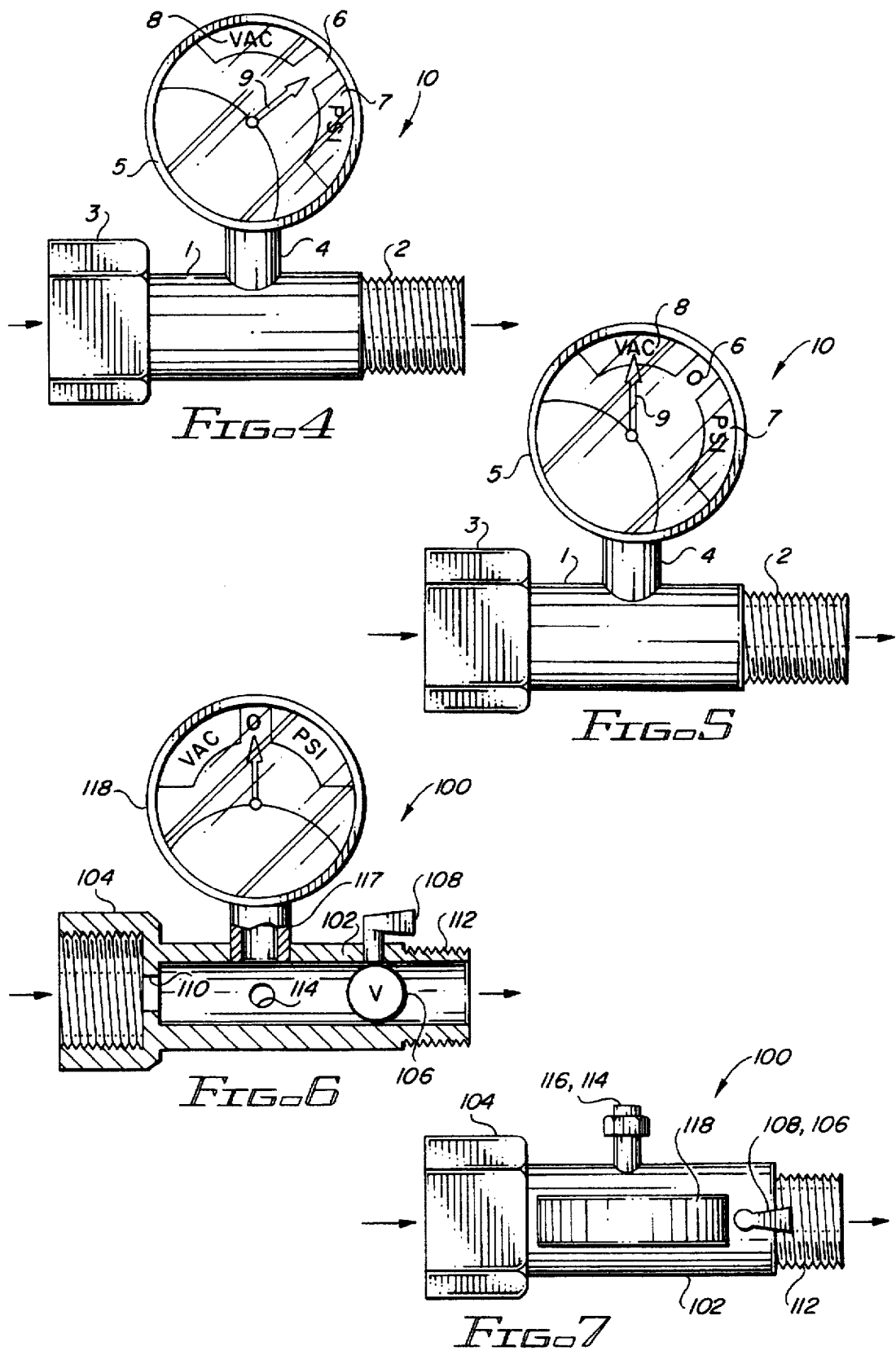

1

MARINE IMPELLER TESTER

CROSS REFERENCE TO RELATED APPLICATION

This application is a Divisional application of Ser. No. 08/341,675, filed Nov. 17, 1994, now U.S. Pat. No. 5,503,022, dated Apr. 2, 1996, which was a Continuation-In-Part application of Ser. No. 08/253,972, filed Jun. 3, 1994, now U.S. Pat. No. 5,445,012, which was a Continuation application of Ser. No. 08/008,474, filed Jan. 25, 1993, now abandoned.

BACKGROUND OF THE INVENTION

1. Field of the Invention

The field of the invention relates to engines for boats, and more particularly, to a new and improved method of determining if the water impeller, which is located in the drive unit, of a marine engine, and which pumps coolant water to the engine from the body of water on which the boat or watercraft is disposed, is functioning properly.

The impeller tester provides for the measurement of the inlet and outlet water pressures. These pressures are measured and transmitted through a calibrated gauge or calibrated transducers and lamp modification to indicate to the operator if the water impeller has adequate water supply and if the water impeller is functioning properly.

2. Description of the Prior Art

While various devices and components have been utilized in the prior art in allowing the marine engine to be started and run out of water, they have not communicated if the water impeller in the out drive unit is functioning properly.

Prior state of the art devices are only designed to supply water to the marine engine's drive unit. These devices allow for a method to attach a standard garden hose from a faucet to the drive unit. The amount of water supplied from the faucet is not monitored by these devices and only allows that water be supplied to the marine engine by the water pressure which is available within the municipal water system. A fault of these water supply systems is that they do not indicate if sufficient water pressure is being supplied to safely run the engine, without damaging the water impeller, nor can they determine if the water impeller which is located in the drive unit is functioning and capable of pumping non-pressurized water to the marine engine. These devices thereby will allow the engine to function correctly and not over heat when tested out of the water even though the water impeller in the drive unit has failed and is no longer capable of pumping ambient water (unpressurized) to the marine engine when the watercraft is put in actual service.

As such, it may be appreciated that there continues to be a need for a new and improved method to monitor water pressures both while supplying water to a marine engine when being tested out of water and while the craft is in actual service.

The testing of the boat or watercraft's marine engine is done out of water in order to determine if the marine engine is operating properly prior to taking it to an area intended for watercraft use.

Prior art testing devices allow water to be supplied to the marine engine but do not communicate whether or not the drive components are functioning properly. This is due to the water being supplied under pressure. Water supplied under pressure will supply the engine with sufficient coolant so that it appears to be functioning properly even though the water impeller has failed and will not supply water to the marine engine when the watercraft is put in actual use.

2

U.S. Pat. No. 2,100,754 (Seegers) discloses a pressure gauge which includes a dual gauge, with one portion of the dial graduated for vacuum pressure and a second portion for positive pressure readings. The dial is adjustable to provide a desired zero reference.

U.S. Pat. No. 2,227,514 (Seegers) discloses another type of pressure gauge in which the dial is also calibrated for vacuum pressure and for positive pressure. The dial is adjustable to provide a desired zero reference.

U.S. Pat. No. 2,247,102 (Sugden et al) discloses a pressure gauge having an adjustable dial.

U.S. Pat. No. 3,969,931 (Lanning) discloses tester apparatus for testing the hydraulic capabilities of an outboard drive assembly.

Italian patent 277,473 (Drager) discloses the coupling of a gauge to a fluid line.

Italian patent 546,083 (Malakoff) discloses the use of a pressure gauge between threaded ends for insertion into a fluid line.

SUMMARY OF THE INVENTION

In view of the foregoing disadvantages inherent in the known methods of supplying water to a marine engine while being tested out of water, the instant invention provides an impeller tester which communicates to the operator that there is sufficient inlet water pressure available and correct outlet vacuum pressure induced by the water impeller when the unit is tested out of water. This is necessary if an individual is to insure that the marine engine will be supplied with sufficient coolant when the water impeller is not being supplied with pressurized coolant from a household faucet. As such, the general purpose of the instant invention, which will be described subsequently in greater detail, is to provide a new and improved method of supplying pressurized coolant to a marine engine and which has all the advantages of prior art and none of the disadvantages.

The marine engine, both inboard and outboard types, is equipped with a drive unit. This out drive unit not only incorporates the means to propel the craft by the rotation of a propeller, but also incorporates a water impeller which provides the means to pump water to the marine engine's cooling components while the craft is in service.

Prior the art devices are designed to supply water to the drive unit in order that the marine engine can be test run when the craft is out of the water prior to taking the craft to the desired recreation area, but do not incorporate any method of monitoring whether correct initial water pressure is present or whether the water impeller is functioning correctly.

One embodiment of the present invention comprises a cylinder housing which has a female thread at one end to allow a standard garden hose to be attached to the cylinder. On the other end of the cylinder is a male thread which allows the cylinder to be attached to existing devices used in supplying pressurized water to the out drive unit. The invention also incorporates a nipple in its center to provide for the attachment of a calibrated gauge.

The gauge has two calibrated scales which are separated by a zero position between them. On one side of the zero position the gauge is calibrated to read water pressure in PSI, and on the other side of the zero position the gauge is calibrated to read Inches of Vacuum. The pressure side of the gauge measures the water pressure supplied to the drive unit from the garden hose or other source of input water. The gauge is scaled so the operator can adjust the inlet water pressure to a specific value and insure that a sufficient amount of water is being supplied so that the water impeller is not damaged when the marine engine is started. The gauge is rotatable to allow the scale to be rotated to the zero position prior to starting the engine. Upon starting the marine engine, the second scale of the gauge will communicate to the operator of the apparatus that the water impeller is providing adequate suction (Inches of Vacuum) to supply the engine with coolant water.

The gauge is calibrated in two modes to insure that the operator can visually determine by the calibrations on the gauge that sufficient water is initially being supplied and that the water impeller is providing sufficient suction to supply proper coolant to the engine when the craft is put in actual operation and the water impeller is not being supplied by a pressurized water source.

Additional forms of the present invention include the integration of the means to supply the pressurized water to the drive unit in conjunction with the impeller tester being an integral part of the water supplying device. Also, a form of the invention may be installed permanently in the watercraft and may display to the operator that the water impeller is providing an adequate water supply to the engine while the craft is in actual use.

It is an object of the instant invention to provide a new and useful impeller tester which has all the advantages of the prior art and none of the disadvantages.

It is another object of the instant invention to provide a new impeller tester which may be easily and efficiently manufactured and marketed.

It is a further object of the instant invention to provide a new impeller tester which is of a durable and reliable construction.

It is another object of the present invention to provide new and useful apparatus for testing the impeller of a marine drive unit.

It is another object of the present invention to provide new and useful apparatus for continually monitoring the output of an impeller in an marine drive unit.

It is another object of the present invention to provide an emergency water pump for a marine engine.

BRIEF DESCRIPTION OF THE DRAWING

FIG. 4 is a front view of the apparatus of the present invention sequentially following FIG. 3 and illustrating the operation thereof.

FIG. 5 is a front view of the apparatus of the present invention sequentially following FIG. 4 in illustrating the operation of the apparatus.

FIG. 6 is a view in partial section schematically illustrating an alternate embodiment of the apparatus of FIGS. 1–5.

FIG. 7 is a top view of the apparatus of FIG. 6.

DESCRIPTION OF THE PREFERRED EMBODIMENT

Figure 1:
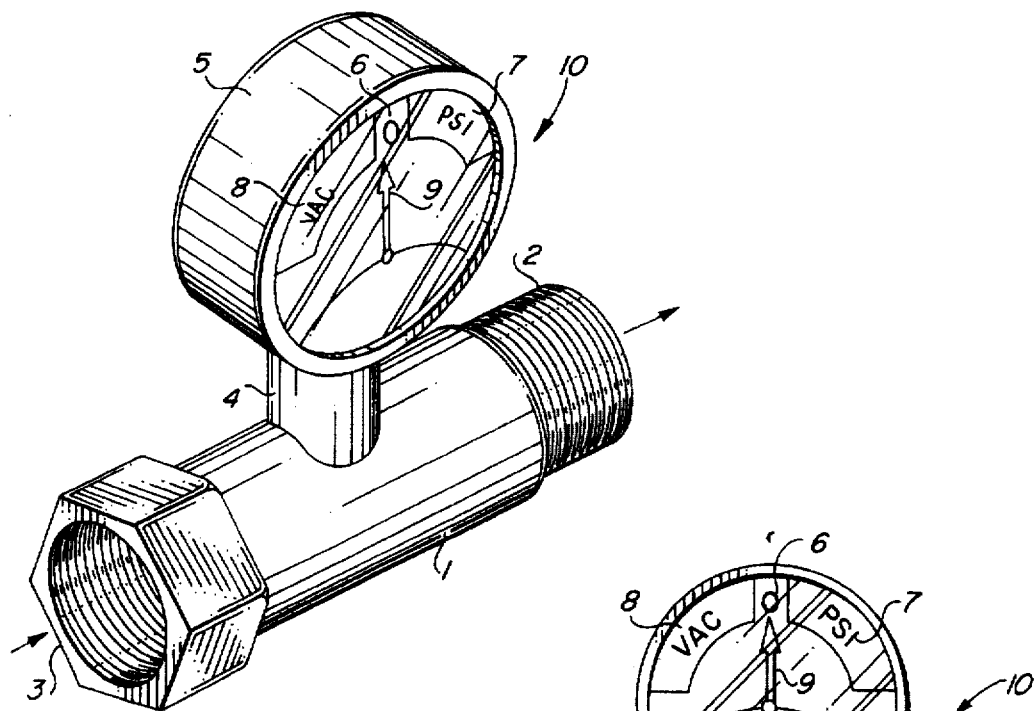
FIG. 1 is a perspective view of the apparatus of the present invention.

FIG. 1 is an isometric projection of an impeller tester apparatus 10 in accordance with the present invention. The apparatus 10 includes a cylinder 1 through which water flows in the direction indicated by the arrows. A calibrated gauge 5 is secured to the cylinder 1 to indicate the relative pressure of the water flowing through the cylinder 1.

Figure 2:
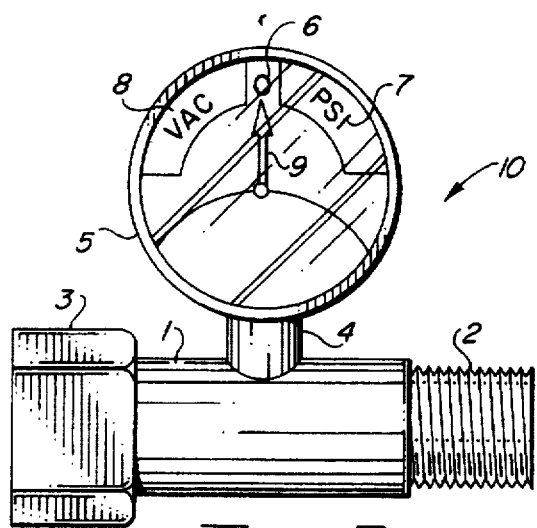
FIG. 2 is a front view of the apparatus of FIG. 1.

FIG. 2 is a front view of the calibrated gauge 5 included in the apparatus 10. The gauge 5 is set in a pre-test position and water is not being supplied to the crafts water impeller in the FIG. 2 condition.

Figure 3:
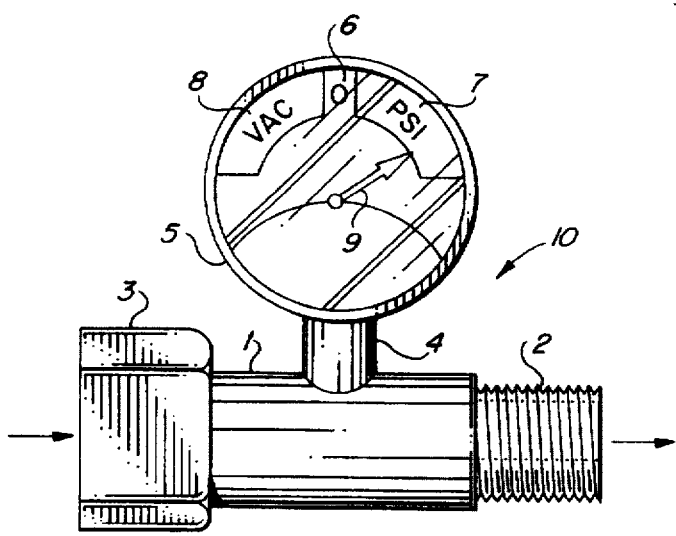
FIG. 3 is a front view of the apparatus of FIG. 2 illustrating the use thereof.

FIG. 3 is a front view of the calibrated gauge 5, with water being supplied to the water impeller tester apparatus 10. The gauge 5 is indicating the water pressure supplied to the water impeller of a craft prior to starting the craft's engine.

FIG. 4 is a front pictorial view of the calibrated gauge 5 sequentially following FIG. 3, with the gauge 5 rotated clockwise to the zero position, effectively canceling out the pressure of the supplied water for test purposes.

FIG. 5 is a front pictorial view of the calibrated gauge 5, sequentially following FIG. 4. The craft's engine is now started and the calibrated gauge 5 is indicating that sufficient vacuum is being produced by the water impeller of the craft to insure that sufficient coolant is supplied to the engine of the craft when the craft is put in actual operation.

Arrows in FIGS. 1, 3, 4, and 5 indicate the direction of water flow.

Figure 8:
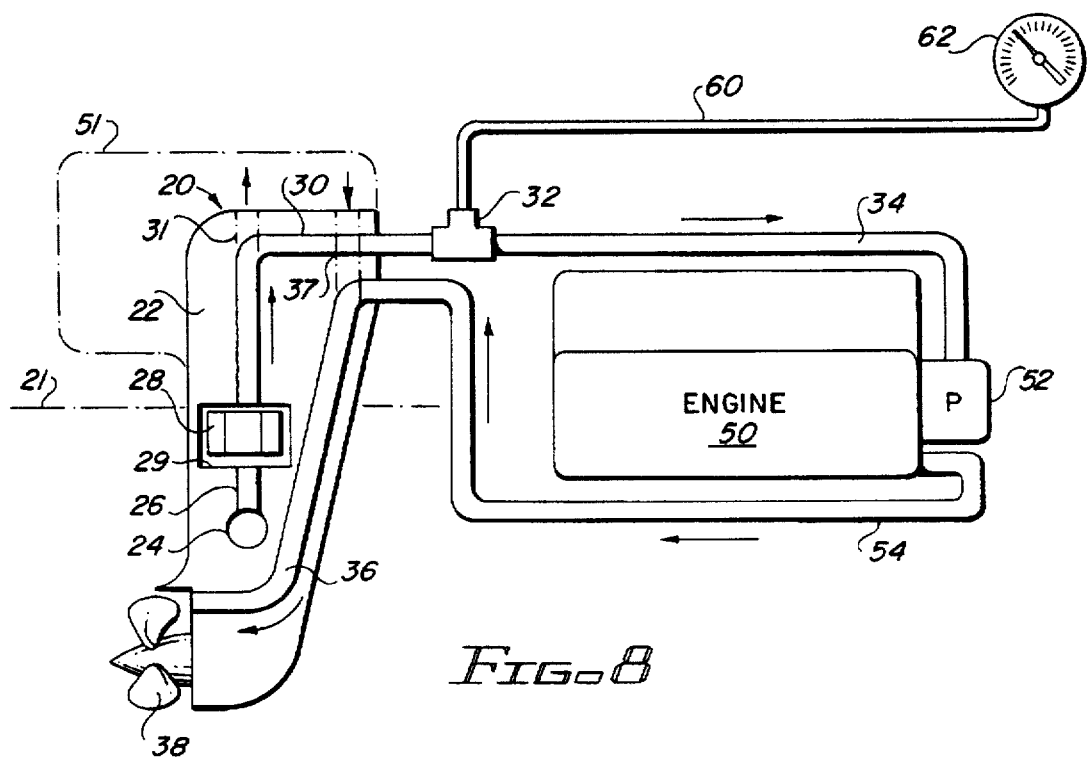
FIG. 8 is a side view schematically illustrating an alternate embodiment of the apparatus of the present invention.

The impeller tester apparatus 10 comprises the cylinder member 1, and at one end of the cylinder 1 there is an attachment 3 which allows the impeller tester 10 to be connected to a standard household water faucet or hose bib by a garden hose (See FIG. 7). At the opposite end of the cylinder 1 is a male threaded end 2 which attaches to an existing water supply device, such as shown in FIGS. 7 and 8, currently available for supplying coolant to the out drive of a boat.

Also attached to the cylinder member 1 is a nipple 4 which allows the calibrated gauge 5 to be attached to the cylinder member 1. The calibrated gauge 5 includes a zero position 6 between a positive pressure scale 7 and a vacuum pressure scale 8. Pressure is indicated by a pointer 9.

The calibrated gauge 5 incorporates the means for the operator to determine the necessary water pressure required for the water impeller by monitoring the reading of the pointer 9 on the positive pressure scale 7 when water is supplied but prior to starting the engine as shown in FIG. 3.

The calibrated gauge 5 is also capable of being rotated to the pre-test zero position 6. After the water impeller is supplied with an adequate water supply, as specified on the scale 7 within the calibrated gauge 5, the gauge is then rotated to the zero position 6, as shown in FIG. 4. At this time the marine engine is then started. The operator can then observe the vacuum scale 8 of the calibrated gauge 5 to determine if sufficient vacuum is being produced by the water impeller to supply the marine engine with proper coolant during its normal operation. This is determined by the operator observing the indication of the pointer 9 within vacuum scale 8, as shown in FIG. 5.

If the pointer 9 is within the appropriate range or scale value within the vacuum scale 8, then the required vacuum is present to insure that the water impeller is operating properly and will supply the marine engine with sufficient coolant to allow for safe operation when the craft in which the engine and the drive unit is disposed is put in its intended use environment.

FIG. 6 comprises a view in partial section schematically illustrating an alternate embodiment 100 of the apparatus 10 of FIGS. 1–5. FIG. 7 is a top view of the apparatus 100 of FIG. 6. For the following discussion, reference will primarily be made to FIGS. 6 and 7.

The embodiment 100 comprises a cylinder 102 with an input connector 104 on one end and a threaded, output connector 112 at the opposite end of the cylinder 102 from the input connector 104. Large arrows adjacent to FIGS. 6 and 7 illustrate the direction of the flow of the water through the apparatus 100.

Remote from the input connector 104, which is substantially identical to the attachment connector 3 of the apparatus 10 of FIGS. 1–5, and adjacent to the output connector 112, is a valve 106. The valve 106 is disposed in the bore of the cylinder 102. The valve 106 is a variable flow valve. The valve 106 includes a valve actuator 108 extending outwardly from the cylinder 102. Movement of the actuator 108 varies the flow of water through the valve 106 and accordingly through the cylinder 102.

Adjacent to the input connector 104 is an orifice 110. The orifice 110 extends through a wall at the input end 104 of the cylinder 102.

The purpose of the orifice 110 is to make certain that the apparatus 100 functions properly with low water pressure as input to the apparatus 100. The orifice 110 also serves to regulate the flow rate requirements for various size engine displacements.

Extending radially through the cylinder 102 is an air bleed aperture 114. The air bleed aperture 114 extends to an air bleed valve 116. The valve is shown in FIG. 7, while the aperture is shown in FIG. 6.

The purpose of the aperture 114 and the valve 116 is to allow air to be bled from the apparatus 100 when water is initially turned on. That is, when a hose is connected to the input connector 104, and water is turned on, the valve 116 is opened, and remains open until water flows substantially continuously from the valve 116. At that time air has been purged from the apparatus 100 and the valve 116 may then be closed.

Extending upwardly from the cylinder 102 is a nipple or conduit 117. The nipple or conduit 117 extends between the cylinder 102 and a gauge 118. The gauge 118 is substantially identical to the gauge 5 of the apparatus of FIGS. 1–5. The gauge 118 accordingly includes provision for zeroing the pointer after the initial water pressure stabilizes and before the engine to which the apparatus is connected begins to run. This is all as discussed above.

The purpose of the valve 106 and its actuator 108 is to enable an operator or user of the apparatus 100 to provide a desired initial pressure for the apparatus. In essence, the valve 106 and its actuator 108 work in conjunction with the orifice 110. It is preferable to have an initial desired pressure of 8 to 12 PSI from the input water connection 104 through the apparatus 100 and on to the tester apparatus, as will be discussed in detail below.

It appears that a minimum pressure of about 6 PSI is required in order to accurately test an impeller of a boat drive system. Thus, when the air bleed valve 116 is closed, the valve actuator 108 is adjusted to control the flow through the cylinder 102 in order to provide the desired initial pressure of about 8 to 12 PSI. A maximum desired pressure is about 14 PSI. When the initial pressure has been set, the indicator or pointer is then zeroed, as illustrated in FIG. 4, in order to test the impeller of the boat drive, as will be discussed in detail below.

If desired, the absolute pressure scale of the gauge 118, which shows only the pressure of the water, before the zeroing function, may be appropriately color coded. Accordingly, there would be a yellow line between 6 and 8 PSI on the scale, then a green line between 8 and 12 PSI, and another yellow line between 12 and 14 PSI. A red line would extend above 14 PSI to indicate that such pressure is too high for proper functioning of the tester apparatus.

Figure 10:
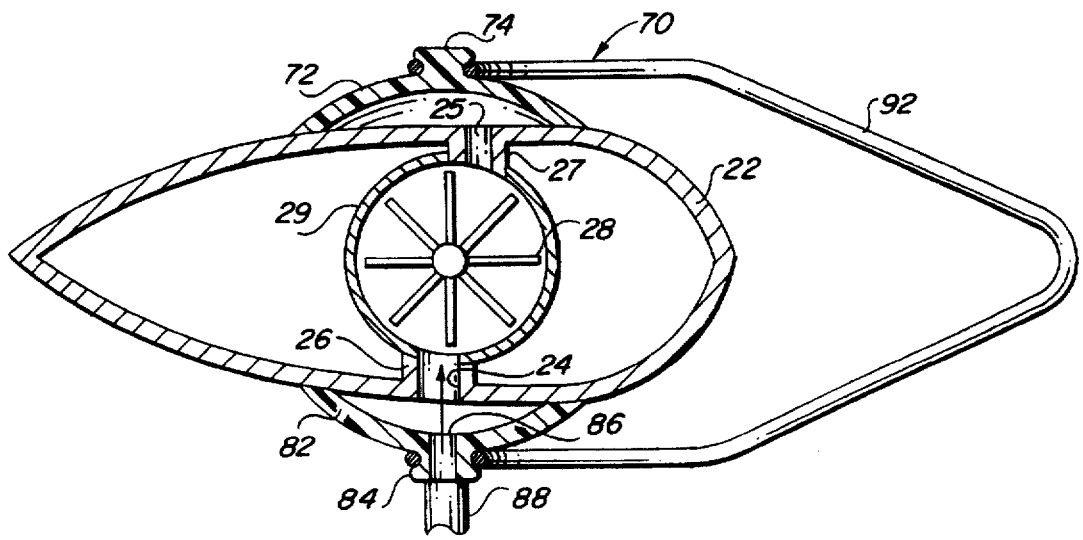
FIG. 10 is a view in partial section illustrating the operation of the apparatus of FIG. 7 related to the environment of a portion of the apparatus of FIGS. 8 and 9.

FIG. 8 is a schematic diagram illustrating an alternate embodiment of the apparatus of the present invention. The embodiment of FIG. 8 includes a drive unit 20 which is connected to a water cooled engine 50. FIG. 10 comprises a view in partial section through the drive unit, and a tester is shown secured to the drive unit. For the following discussion, reference will primarily be made to FIGS. 8 and 10.

The drive unit 20 includes a housing 22 with a pair of water input openings 24 and 25 in the housing 22. A pair of conduits 26 and 27 extend from the openings 24 and 25, respectively, to a housing or chamber 29 in which is disposed an impeller 28. From the chamber 29 in which the impeller 28 is disposed, a conduit 30 extends through the drive 20 and to a tee 32.

When the drive unit 20 is disposed in the water, the chamber 29 is below the water line so that the chamber automatically fills with water. The water line is indicated in FIG. 8 by a dashed line 21.

From the tee 32, a conduit 34 extends to a water pump 52 on the engine 50. The water pump 52 receives the flow of water from the impeller 28 and circulates the water as a coolant through the engine 50.

From the engine 50, a return water conduit 54 extends to the drive unit 20 and to a conduit 36 therein. The water from the conduits 54 and 36 is then discharged from the drive 20 adjacent to a propeller 38.

The mechanical elements which transmit the power from the engine 50 to the propeller 38 are not shown, since they are not part of the present invention. Rather, only the engine 50 and its components which relate rather directly to the present invention, along with the drive unit 20 and its elements, which are cooperatively involved in the present invention, are illustrated.

From the tee 32, a conduit 60 extends to a gauge 62. The gauge 62 is responsive to the pressure of the water flowing in the conduit 30 from the impeller 28.

With the engine 50 operatively connected to the drive 20, and with the drive 20 disposed in water, the output of the impeller 28 to the water pump 52 is monitored by the gauge 62. The gauge 62 is a pressure gauge which has a direct reading, unlike the gauge 5 illustrated in FIGS. 1–5. Thus, the gauge 62 monitors the output of the impeller 28 to provide cooling water to the water pump 52 while the drive 20 is in the water, and while the drive 20 is propelling a craft powered by the engine 50.

Figure 9:
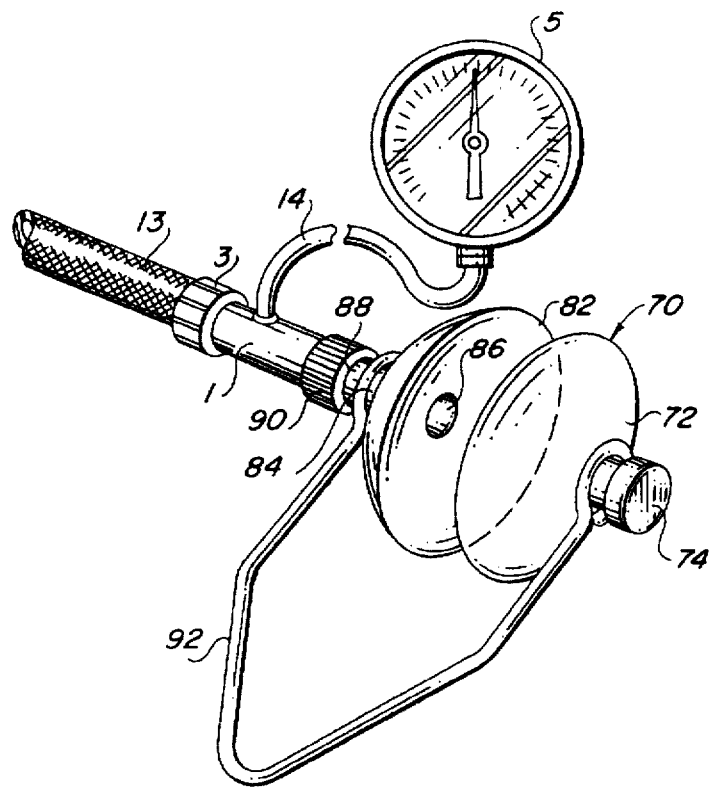
FIG. 9 is a perspective view illustrating the operation of the elements involved with the apparatus of FIGS. 1–7.

Another alternate embodiment of the apparatus of the present invention is illustrated in FIGS. 9 and 10. FIG. 9 comprises a perspective view of the apparatus of FIGS. 1-7 in a use environment for monitoring the output of the impeller 28 when the drive 20 is out of the water. A hose 13, which may be a garden hose, or the like, appropriately connected to a source of water pressure, is connected to the attachment 3 of the cylinder 1. The opposite end of the cylinder 1, remote from the input attachment 3, is in turn connected to a testing clamp or tester 70.

FIG. 10 comprises a view in partial section through the testing clamp 70 disposed over the openings 24 and 25 in the drive housing 22. For the following discussion, reference will primarily be made to FIGS. 9 and 10.

The tester 70 includes a pair of cups, including a cup 72 and a cup 82. The cups 72 and 82 are secured together by a clamp 92. The cup 72 includes a knob 74, and one portion of the clamp 92 is secured to the knob 74. The cup 72 is secured to the drive housing 22 over the opening 25.

The cup 82 includes a knob 84, and a bore 86 extends through the knob 84 and the cup 82 to communicate with the interior of the cup 82 and accordingly to communicate with the opening 24 when the tester 70 is in place. The clamp 92 is also secured to the knob 84 of the cup 82.

A conduit 88, with a fitting 90, is appropriately secured to the cup 82 at the bore 86.

A flow of water through the hose 13 flows through the cylinder 1, which is secured to the fitting 90, and through the conduit 88, the opening 24, the conduit 26, and to the impeller 28 in the chamber 27. The gauge 5 is adjusted as discussed above in conjunction with the explanation of FIGS. 1-5, to indicate the pressure of the flow of water through the hose 13. When the engine 50 is then started, if the impeller 28 is functioning properly, there will be a drop in the pressure, as indicated in FIG. 5. The drop in pressure indicates the functioning of the impeller 28.

Figure 11:
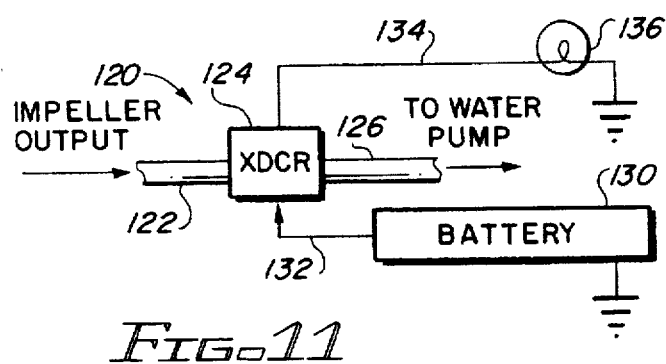
FIG. 11 is a schematic circuit diagram illustrating the operation of the apparatus of FIG. 8.

FIG. 11 is a schematic circuit diagram of another alternate embodiment of the apparatus of the present invention, and related primarily to the embodiment of FIG. 8.

In the embodiment of FIG. 11, a light or lamp system embodiment 120 is illustrated. The light or lamp system embodiment 120 includes an input water conduit 122, which is comparable to the conduit 30 illustrated in FIG. 8. The conduit 122 extends to a pressure transducer 124, which replaces the tee 32 of FIG. 8. A conduit 126 extends from the pressure transducer 124 to a water pump, such as the water pump 52 of FIG. 8.

The pressure transducer 124 is connected to a battery 130 by a conductor 132. The pressure transducer 124 is also connected to a lamp 136 by a conductor 134.

During the operation of the engine to which the apparatus 120 is connected, if the pressure sensed by the pressure transducer 124 drops below a predetermined minimum, current flows from the battery 130 through the conductors 132, the transducer 124, and the conductor 134 to illuminate the lamp 136. The illumination of the lamp 136 indicates that there is a drop in the water pressure. This in turn indicates that the impeller which provides a flow of water through the conduit 122 is not functioning properly.

Figure 12:
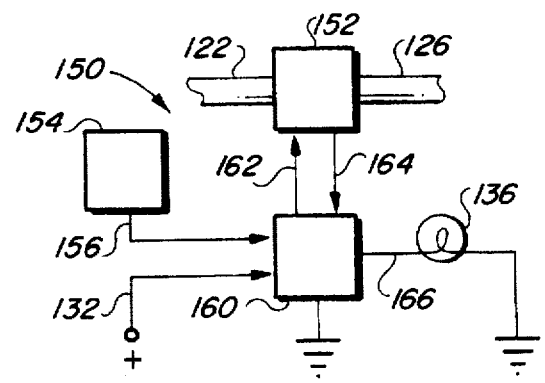
FIG. 12 is a schematic diagram of another alternate embodiment of the apparatus of the present invention.

FIG. 12 comprises a schematic circuit diagram of an alternate embodiment of the light system embodiment of FIG. 11. FIG. 12 accordingly comprises an enhanced electronic or lamp system 150 in which the output of a pressure transducer 152 is modified or varied in accordance with the speed of an engine, not shown, such as the engine 50.

In the embodiment of FIG. 12, the water input conduit 122 from the embodiment of FIG. 8 is again illustrated as comprising the water input to the pressure transducer 152. The water conduit 126 then extends from the pressure transducer 152 to the water pump of the engine to which the apparatus 150 is connected, as discussed above.

The output of the pressure transducer 152 varies in response to the pressure of the water in conduit 122, and the water pressure in turn is responsive to the speed of the engine, such as the engine 50, to which the apparatus 150 is connected.

The speed of the engine is transmitted from an engine coil or ignition module 154 on a conductor 156 to an electronic control module 160. The electronic control module 160 includes microprocessor technology to respond to the speed of the engine, as indicated by input pulses on the connector 156 from the coil or module 154, and to predetermined parameters of pressure, depending on engine speed. Power for the control module 160 is provided by the conductor 132 from a battery, such as the battery 130 as shown in FIG. 11.

A conductor 162 extends from the control module 160 to the transducer 152. Input voltage to the transducer 152 flows to the transducer 152 on the conductor 162, and an output voltage from the transducer 152 is transmitted to the control module 160 on a conductor 164. The voltage on conductor 162 comprises control voltage for the transducer 152, and is battery voltage. The output voltage from the transducer 152 on conductor 164 comprises input voltage for the control module 160.

The electronic control module 160 interprets the input voltage on conductor 164 from the transducer 152 in terms of the rpm of the engine, as indicated by the input pulses or input signal on conductor 156. It is only when the two input signals on conductors 156 and 164 are "out of balance" that an output from the control module 160 on a conductor 166 to the lamp 136 causes the lamp 136 to be illuminated. Thus, the illumination of the lamp 136 indicates an imbalance in the desired or appropriate pressure in the conduit 122 in relation to the rpm of the engine.

There has thus been outlined, rather broadly, the more important features of the instant invention in order that the detailed description may be better understood, and in order that the present contribution to the art may be better appreciated. Those skilled in the art will appreciated that the conception, upon which this disclosure is based, may readily be utilized as a basis for the designing of other structures, methods and systems for carrying out the several purposes of the instant invention. It is important, therefore, that the claims be regarded as including such equivalent constructions insofar as they do not depart from the spirit and scope of the instant invention.

The gauges discussed above in conjunction with the various embodiments have been generally described simply as "gauges" without regard to their types. Reference has been made to absolute pressure, and, of course, reference has been made to the zeroing of the gauge and the illustration of vacuum pressure on one side of the zero and positive pressure on the other side of the scale. This is best shown in FIGS. 1-5. The pressure gauges accordingly have been direct reading pressure gauges, in which the pressure is a direct reading resulting from the flow of the water through the cylinders to which the gauges are attached. However, it may be desired to use a liquid filled gauge, which includes a diaphragm for actuating a pressure pointer. In such case, a movable bezel will be fitted over the liquid filled gauge, with the movable bezel simply showing a zero index which will be placed over the pointer after the initial pressure has been established. When the engine of the boat is started after the gauge has been zeroed, a pressure drop may be noted from the zero point.

Moreover, while the apparatus of the present invention has been described in terms of a drive unit 20, shown as a stern drive unit connected to an inboard engine 50, it is obvious that the invention also applies to a total outboard unit in which the engine is disposed above the drive unit. Such is illustrated in dash dot line in FIG. 8 by an engine 51 disposed at the upper portion of the drive unit 20. Such are well known as simply outboard units. Such outboard units have essentially the same elements and requirements as discussed in conjunction with the engine 50.

Figure 13:
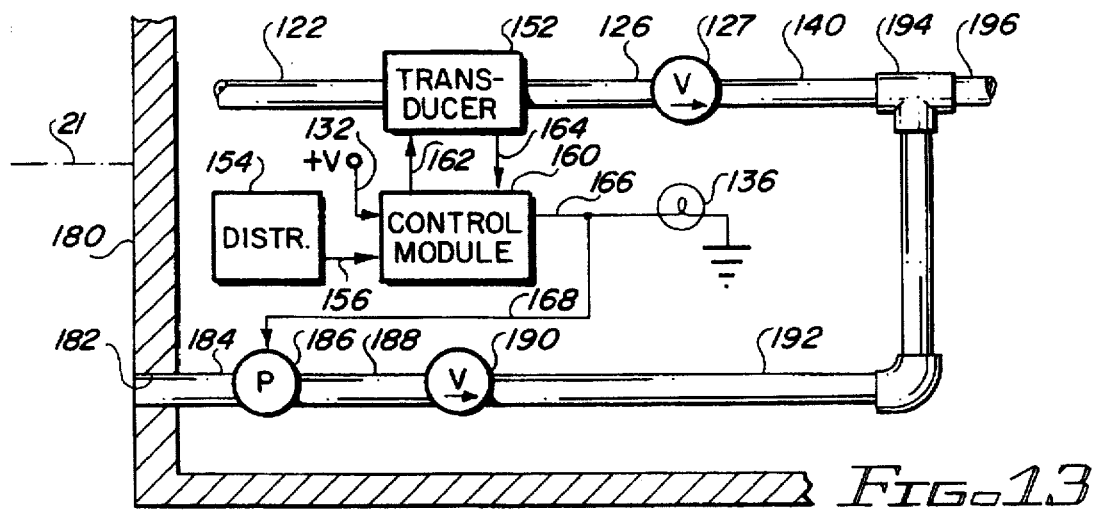
FIG. 13 is a schematic representation of an alternate embodiment of the apparatus of the present invention utilizing an auxiliary electric water pump.

FIG. 13 comprises an alternate embodiment of the apparatus of the present invention in which an auxiliary or emergency water pump is used in the environment of FIG. 12.

FIG. 13 shows a transom 180 of a boat or water craft, but with the drive unit omitted for purposes of clarity. The water line 21 is indicated by the dashed line. Beneath the water line 21, and extending through the transom 180, is an aperture 182. A conduit 184 extends from the aperture 182 to a pump 186. A conduit 188 extends from the pump 186 to a one way check valve 190. A conduit 192 extends from the one way check valve 190 to a tee element 194.

The input conduit 122 from the impeller (See FIG. 12) is shown extending to the transducer 152, and the conduit 126 is shown extending from the transducer 152 to a check valve 127. From the check valve 127, a conduit 140 extends to the tee 194. Thus, water flow from both the impeller through the conduit 122, etc. and from the pump 186 extends to the tee 194. From the tee 194, a conduit 196 then extends to the engine driven water pump, such as the pump 52. Shown in FIG. 8.

Output of the pump 186, which is an electrical pump, is controlled by the control module 160. The control module 60 acts in substantially the same way as discussed above in conjunction with FIG. 12. Thus, when the control module 60 senses that the output of the impeller through the conduit 122 and the transducer 152 is below a predetermined minimum, current transmitted on conductor 166 will cause the lamp 136 to be illuminated, thus advising the users of the craft that the impeller of the drive unit has either failed or is not producing substantial water output for cooling the engine.

A conductor 168 extends from the conductor 166 to the emergency or auxiliary pump 186. The current flow on the conductor 166 and the conductor 168 will cause the pump 186 to begin pumping cooling water from below the water line 21 through the aperture 182 and the conduit 184, etc., as discussed above. The pump 166 is illustrated as a constant speed pump, and its output is accordingly constant.

It will be understood that the auxiliary pump 186 may also be used in the environment of FIG. 11, in which the engine RPM is not taken into consideration with respect to the pumping efficiency of the impeller of the drive unit. Rather, in the embodiment of FIG. 11, if the flow of water from the impeller through the conduit 122 drops below a predetermined minimum, as sensed by the transducer 124, current flows through the conductor 134 to illuminate the warning lamp 136. In such case, the pump 186 may be connected directly to the conductor 134, again causing the pump 186 to pump water to the engine driven water pump.

The check valves 190 and 127 insure that there is a one way flow of the water to the engine driven water pump.

Figure 14:
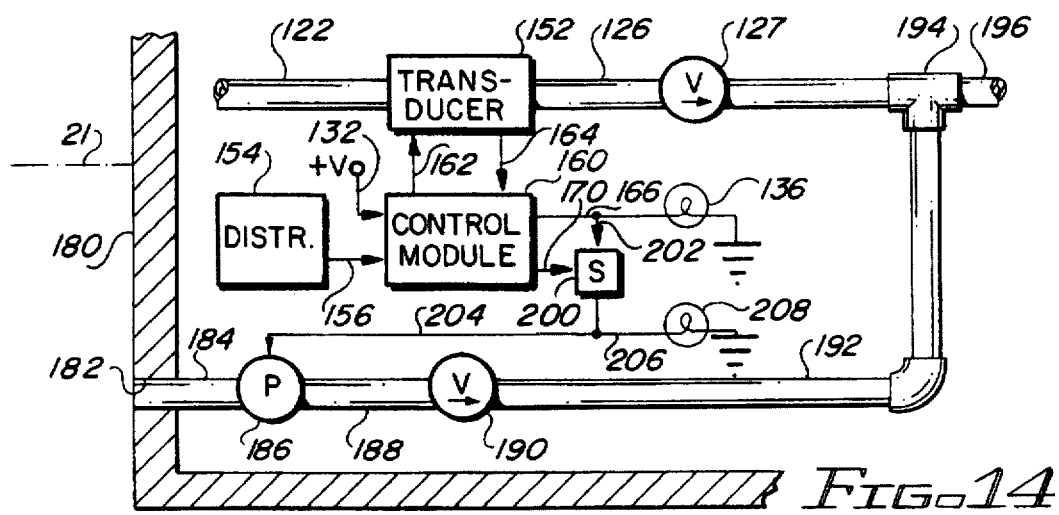
FIG. 14 is a schematic representation of an alternate embodiment of the apparatus of FIG. 13.

FIG. 14 comprises a schematic representation of an alternate embodiment of the apparatus illustrated schematically in FIG. 13, utilizing a solenoid to actuate the auxiliary pump 186. Essentially, the above description of the apparatus illustrated in FIG. 13 is also applicable to the embodiment of FIG. 14, except that a solenoid 200 is connected to the conductor 166 by a conductor 202. In turn, the solenoid 200 is connected to the pump 186 by a conductor 204. A conductor 206 extends from the conductor 204 to a lamp 208.

When the information from the transducer 152 indicates that water flowing through the conduit 122 from the impeller in the drive unit drops below a predetermined minimum flow rate in accordance with the parameters determined in response to the speed of the engine from the coil or the ignition module 154, the control module 160 causes a current flow in conductor 166 to illuminate the warning lamp 136. At the same time, the current flow in conductor 166 is transmitted by the conductor 202 to the solenoid 200. The solenoid 200 is thus energized, and in turn turns on the pump 186. The pump 186 is a variable speed pump whose output varies with its input voltage. The input voltage to the pump 186 is from the control module 160 on conductor 170 through the now energized solenoid 200 and the conductor 204 from the solenoid. Current on conductor 204 also illuminates the lamp 208 via conductor 206. The lamp 208 confirms that the solenoid 200 has been energized to turn on the pump 186.

The voltage on conductor 170 is a variable voltage, responding to the input from the distributor 154. The output of the pump 186 thus varies with engine speed.

The pump 186 pumps water from the aperture 182 and the transom 180 beneath the water line 21 through the conduit 184, and through the conduit 188 and through the one way check valve 190, and the conduit 192 to the tee 194. The water from the pump 186 then flows through the conduit 196 to the engine driven water pump (See FIG. 8). The check valve 127 insures that water from the conduit 192 does not flow backwards, but flows only through the conduit 196 to the engine driven water pump.

Figure 15:
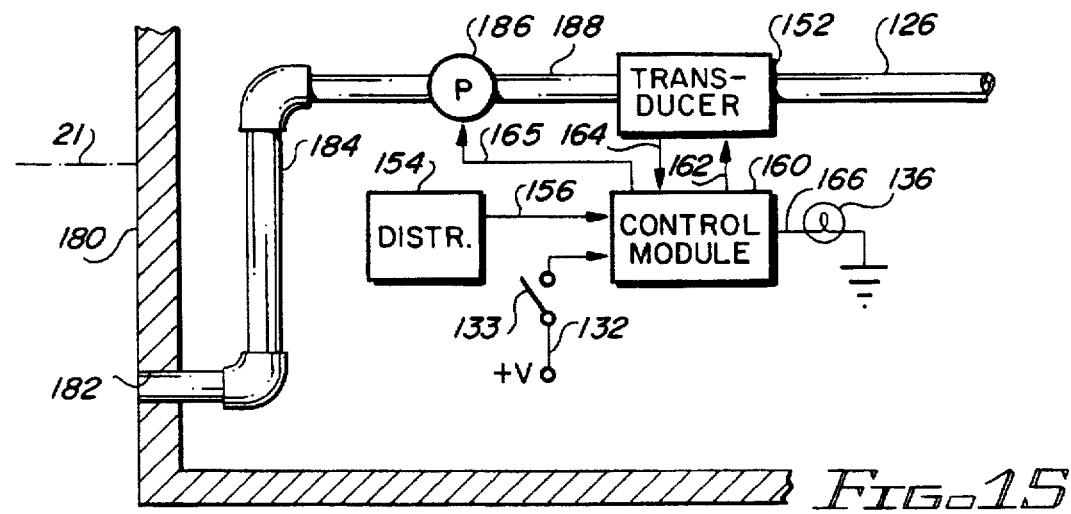
FIG. 15 is a schematic representation of another alternate embodiment of the apparatus of FIG. 13.

FIG. 15 comprises another alternate embodiment in which the impeller of the drive unit is completely eliminated. The electric pump 186 is connected directly to the transducer 152 by the conduit 188. Thus, water from below the water line 21 flows through the aperture 182 in the transom 180 and through the conduit 184 directly to the pump 186. From the pump 186, the conduit 188 extends to the transducer 152. From the transducer 152, the conduit 126 extends to the engine of the water craft and to the engine driven water pump thereon.

RPM information from the engine (See FIG. 8) is sensed by the distributor coil 154 and is transmitted on conductor 156 to the control module 160. An appropriate voltage is transmitted to the pump 186 on conductor 165 from the control module 160. The voltage on conductor 165 varies with the speed of the engine as represented by the output from the distributor 154.

Thus, the pump 186 of FIG. 13 is a constant speed pump, while the pumps, 186 of FIGS. 14 and 15 are variable speed pumps providing outputs in response to engine speed. Thus, the output of the pump 186 is directly related to the engine RPM or engine speed information sensed by the distributor 154 and transmitted to the control module 160.

From the control module 160, information is transmitted on conductor 162 to the transducer 152. In turn, output information from the transducer 152 is transmitted to the control module 160 on conductor 164 to confirm that the pump 186 is working properly.

The warning lamp 136 is illuminated by an output on the conductor 166 from the control module 160 if the output of the pump 186 fails or is below the predetermined minimum, as determined by the control module 160.

The control module 160 is in turn controlled by an ignition switch 133 in the conductor 132 from the battery positive. Thus, the pump 186 will only operate when the ignition switch 133 of the craft in which the apparatus is installed is closed, thus indicating that the engine is "on" and operating.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Testing apparatus for testing an impeller of a marine engine drive unit having an opening in the drive unit through which water flows to the impeller comprising in combination:

a cup to be secured to the opening in the drive unit;

a bore in the cup through which water flows to the impeller;

a cylinder communicating with the bore;

means for providing a flow of water to the cylinder before the marine engine is started;

a gauge connected to the cylinder for indicating the pressure of the flow of water;

a pointer on the gauge movable in response to the flow of water in the cylinder; and an indicator on the gauge movable to indicate the position of the pointer after the flow of water has been provided for providing a reference point for indicating the status of the impeller after the marine engine is started.

2. The apparatus of claim 1 in which the indicator comprises a movable dial having a vacuum pressure portion and a positive pressure portion on opposite sides of the zero indication.

3. The apparatus of claim 2 which further includes an air bleed valve connected to the cylinder for bleeding air from the cylinder in response to the flow of water.

4. The apparatus of claim 2 which further includes a valve connected to the cylinder for varying the flow of water through the cylinder.

5. The apparatus of claim 2 which further includes an orifice in the cylinder through which water flows to the bore in the cup.

6. The apparatus of claim 1 which further includes a variable valve for varying the flow of water through the cylinder and an orifice in the cylinder through which the water flows to the bore.

7. The apparatus of claim 6 which further includes an air bleed valve for bleeding air out of the cylinder in response to the flow of water to protect the gauge.

* * * * *